Patented Feb. 27, 1951

2,543,318

UNITED STATES PATENT OFFICE 2,543,318

PREPARATION OF 2-THIOPHENEALDEHYDES AND N-METHYL 2-THENYLAMINES

Howard D. Hartough, Pitman, N. J., assignor to Socony-Vacuum Oil Company, Incorporated, a corporation of New York No Drawing. Application April 17, 1948, Serial No. 21,753

14 Claims. (Cl. 260—332.3)

1

The present invention relates to a novel method of preparing 2-thiophenealdehydes and N-methyl 2-thenylamines and, more particularly, to a method of preparing 2-thiophenealdehydes and N-methyl 2-thenylamines from N-(2-thenyl)-formaldimine.

The "Sommelet Reaction" in which benzyl chloride is converted to benzaldehyde by the reaction of the benzyl chloride with hexamethylenetetramine in aqueous alkaline solution is well known. [Compt. Rend., 157, 852, 1443 (1913)]. Duff and Bills (J. Chem. Soc. 1932, 1987) found that heating salicylic acid with hexamethylenetetramine followed by acid hydrolysis of the reaction product gave a salicylic acid aldehyde. These same authors have described the reaction of phenols and naphthols with hexamethylenetetramine (J. Chem. Soc. 1934, 1305) and Duff has described the action of phenol and hexamethylenetetramine in the presence of glycero-boric acid followed by acid hydrolysis from which a salicylic acid aldehyde is isolated in 25 per cent yields. (J. Chem. Soc. 1941, 547.) The latter investigator has also published data on the reaction of N,N-dialkylanilines with hexamethylenetetramine in the presence of formic and acetic acid. The reaction product when treated with hydrochloric acid yielded N,N-dialkylaminobenzaldehydes in 30-40 per cent yields. Graymore and Davies (J. Chem. Soc., 1945, 293) have described the reaction between benzylamine and formaldehyde in which the reaction product, without isolation thereof, is reacted with hydrochloric acid and hexamethylenetetramine, that product isolated and hydrolyzed at reflux temperature with excess concentrated hydrochloric acid to yield benzaldehyde in 66 per cent yields.

It has now been discovered that 2-thiophenealdehydes and N-methyl 2-thenylamines can be prepared from the corresponding N-(2-thenyl)-formaldimines in high yields.

2

It has been shown in applicant's copending application Serial No. 782,962, filed October 29, 1947, that formaldimines can be prepared by mixing an ammonium salt, preferably a halide, formaldehyde and thiophene, heating the mixture sufficiently to initiate the reaction and thereafter cooling the reaction mixture to ambient temperatures. It has also been shown in the copending application Serial No. 782,962 that, although the thenylformaldimines can be distilled as the monomer nevertheless upon cooling after condensation the distillate becomes viscous and behaves as a higher molecular weight compound, i. e., a polymer. It has also been established that N-(2-thenyl)formaldimine exists in two forms; (1) a liquid form which has a molecular weight in boiling benzene of 256 and a composition which justifies the empirical formula $C_6H_7SN_3$, and (2) a crystalline form having a molecular weight in boiling benzene of 368 and a molecular weight of 381 by the freezing point method in cyclohexane. Since the dimer of thenylformaldimine, $C_6H_7SN$, would have a molecular weight of 250 and a trimer would have a molecular weight of 375, it would appear that the liquid form is a dimer and the solid form a trimer. Since 2-thiophenealdehyde has been isolated in about 45-49 per cent yields from the hydrochloric acid hydrolysis of 2-thenylformaldimine in liquid form it would appear that the reaction follows the course indicated by the following equations:

(a) *Electron pair shift*

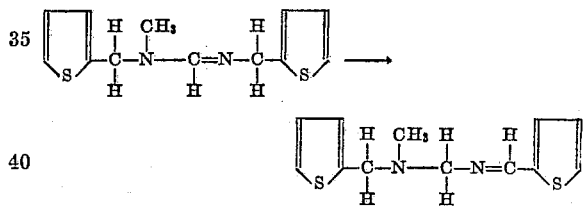

(b) *Hydrolysis*

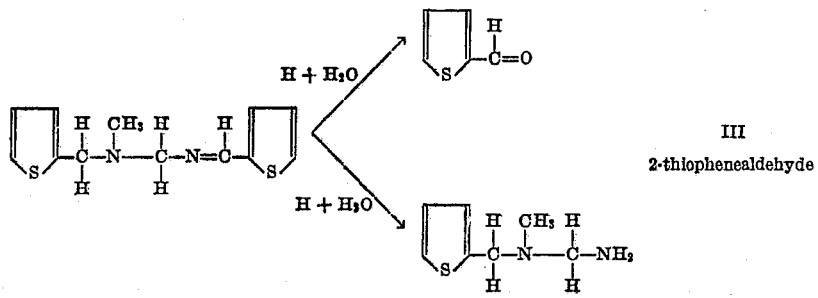

III
2-thiophenealdehyde

(c) Hydrolysis of unstable amine

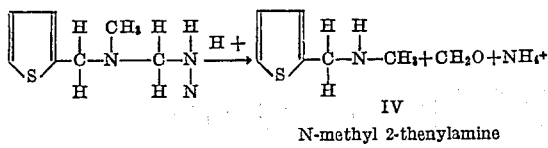

N-methyl 2-thenylamine

However, if hydrolysis is carried out in the original reaction mixture in which the N-(2-thenyl)-formaldimine is produced as described in applicant's copending application Serial No. 782,962 the reaction proceeds in a somewhat different manner and is complicated by the fact that both of the reactive alpha or 2- and 5-positions have reacted and formed other products corresponding to the formulae:

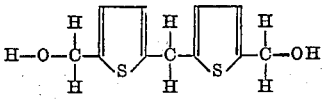

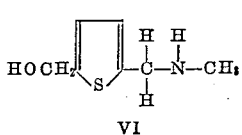

Both V and VI can be oxidized easily to 2,5-thiophenedicarboxylic acid by alkaline permanganate.

It is to be noted that as the yield of IV increases the yield of III decreases. This is true particularly when the acidity in (c) is low.

The reaction of 3-methylthiophene in the manner described hereinafter yields 3-methyl-2-thiophenealdehyde (VII) and N-methyl-3-methyl 2-thenylamine (VIII).

In general, the production of thiophenealdehydes and N-alkyl-2-thenylamines results from the acid hydrolysis of N-(2-thenyl)formaldimines and/or N-alkyl-2-thenylformaldimines at about 0° to about 100° C. It is preferred to employ an acidic medium having a pH of about 3 to about 6.9. When the reaction mixture containing the formaldimine is used it is essential to raise the pH from 1 to a pH between about 3 and about 6.9 or the subsequent heating causes polymerization and little or no 2-thiophenealdehyde is formed. Lowering the pH below 1 causes resinification at temperatures below 80° C.

The thenylformaldimines can be obtained as described in applicant's copending application Serial No. 782,962. However, thenylformaldimines obtained by any other method can also be used.

EXAMPLE I

N-(2-thenyl)formaldimine, ammonium chloride and 36 per cent aqueous formaldehyde solution were mixed in the molal proportion of 1:1.25:2.5. The temperature fell to about 18° C., but quickly rose to about 40° C., and remained at approximately that temperature until all of the N-(2-thenyl)formaldimine had dissolved. The clear solution was warmed to about 70° to about 80° C., held in that temperature range for about two hours, cooled to about 20° C., and the reaction mixture extracted with ether. Removal of the ether yielded a residue of about 5.5 parts by weight which was identified as 2-thiophenealdehyde by conversion to the semicarbazone. The semicarbazone melted, with decomposition, at 223°–224° C. (uncorrected). A mixed melting point with authentic semicarbazone of 2-thiophenealdehyde showed no depression of the melting point.

EXAMPLE II

Twenty parts by weight of N-(2-thenyl)formaldimine (about 0.16 mole) was refluxed for one hour with 200 parts by weight of water containing about 12 parts by weight of concentrated hydrochloric acid and 20 parts by weight of ammonium chloride. The mixture was then steam distilled. The distillate was extracted with ether and about 9 parts by weight of 2-thiophenealdehyde recovered from the ether extract. The 2-thiophenealdehyde was identified through its semicarbazone. A yield of 9 parts by weight of 2-thiophenealdehyde represents a 49 per cent yield.

Neutralization of the mother liquor with solid sodium hydroxide yielded 10 parts by weight of a light-yellow amine (obtained by extraction with ether) having a boiling point of 184° to 185° C., and a refractive index, $n_D^{20}$, of 1.5533. This amine reacted with phenyl isothiocyanate to yield a phenylthiourea having a melting point of 113° to 114° C. When mixed with an authentic phenylthiourea prepared from an authentic N-methyl 2-thenylamine (M. P. 113°–114° C.) there was no depression of the melting point. This product has been found to be a mixture of the phenylthiourea of the N-methyl 2-thenylamine and the thiourea of 2-thenylamine. A contamination of a small amount of the latter gives the M. P. of 113°–114° C. The former melts when pure at 127°–128° C. and the latter at 123.5°–124° C. Thus the original N-methyl 2-thenylamine was contaminated with 2-thenylamine.

EXAMPLE III

A mixture of about 10 moles of thiophene and about 10 moles of ammonium chloride was prepared and about 20 moles of formaldehyde added thereto as a 36 per cent aqueous solution. The final mixture thus formed was warmed to 65° C., the source of external heat removed and the temperature held at about 68° C. for fifteen to thirty minutes. After the temperature fell to 60° C., the reaction mixture was further cooled and about 5.9 moles of thiophene recovered as an insoluble organic layer. The pH of the reaction mixture was raised to about pH 5 by the addition of 1250 parts by volume of aqueous 10 per cent solution hydroxide solution. The aqueous mixture was steam distilled to yield 91 parts by weight of 2-thiophenealdehyde. Extraction of the aqueous layer with benzene yielded 169 parts by weight of a product which upon distillation gave 45 additional parts by weight of 2-thiophenealdehyde (B. P. 70°–80° C. at mm.; $n_D^{20}$ 1.5870). A high boiling cut, about 50 parts by weight, boiling point 130°–133° C. at 4 mm. and having a refractive index $n_D^{20}$ of 1.5856 and about 62 parts by weight of a still residue were also obtained. An intermediate cut indicated the presence of a product of lower refractive index than either of the other two products. Redistillation of the higher boiling cut combined with similar boiling cuts from other preparations yielded a purer product having a boiling point of 110° C. at a pressure of 0.5 millimeter of mercury and a refractive index $n_D^{30}$ of 1.5780. Upon analysis it was found that carbon was present to the extent of 55.65 per cent; hydrogen to the extent of 5.65 per cent and sulfur to the extent of 26.78 per cent. The product was oxidized to 2,5-thiophenedicarboxylic acid (M. P. 358.5°–359.5° C.) with alkaline permanganate. The compound

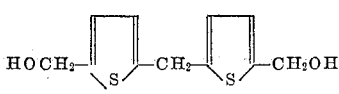

would oxidize to 2,5-thiophenedicarboxylic acid and would have a calculated carbon content of 54.97 per cent, a calculated hydrogen content of 5.03 per cent and a calculated sulfur content of 26.68 per cent as compared to 55.65 per cent, 5.65 per cent and 26.78 per cent found. Accordingly, it would appear that the product in question is $HOCH_2C_4H_2S-CH_2-C_4H_2SCH_2OH$, di-(5-hydroxymethyl-2-thenyl)methane.

The aqueous layer was neutralized with caustic and extracted with benzene to yield about 353 parts by weight of material that distilled from a Claisen flask as follows:

*Table I*

| Fraction No. | Temp., °C. | Pressure, mm. Hg | Parts by Weight | $n_D^{20}$ |
|---|---|---|---|---|
| IBP | 57 | 5 | | |
| 1 | 65 | 5 | 14. | 1.5318 |
| 2 | 74 | 5 | 14.5 | 1.5412 |
| 3 | 80 | 7 | 10.5 | 1.5470 |
| 4 | 80 | 7 | 32 | 1.5470 |
| 5 | 108 | 5 | 14 | 1.5506 |
| 6 | 120 | 5 | 25 | 1.5608 |
| Residuum | | | 173 | |

Fractions 1 and 4 yielded a phenylthiourea with phenylisothiocyanate that melted at 127° to 128° C. The analysis of this material indicated that it contained carbon, 59.00 per cent; hydrogen, 5.66 per cent; nitrogen, 11.05 per cent; and sulfur, 24.0 per cent. The calculated composition of $C_{13}H_{14}N_2S_2$ and the observed composition given hereinbefore is compared as follows:

For $C_{13}H_{14}N_2S_2$:

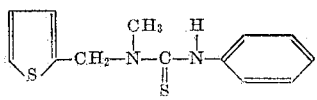

| | Calculated | Found |
|---|---|---|
| Carbon, per cent | 59.54 | 59.00 |
| Hydrogen, per cent | 5.34 | 5.66 |
| Nitrogen, per cent | 10.68 | 11.05 |
| Sulfur, per cent | 24.40 | 24.0 |
| Total | 99.96 | 99.71 |

Oxidation of fraction 4 with alkaline permanganate yielded 2-thiophenecarboxylic acid while oxidation of fraction 6 with alkaline permanganate yielded 2,5-thiophenedicarboxylic acid.

Fractions 1 to 4 were purified further by distillation through a fractionating column. There was definite indication of the presence of two products one with a boiling point of 41.5° C. at a pressure of 2 millimeters of mercury and a refractive index $n_D^{30}$ of 1.5152 and the other having a boiling point of 43° C. at a pressure of 1.2 millimeters of mercury and a refractive index $n_D^{30}$ of 1.5366. However, both products yielded phenylthioureas melting at 127°–128° C. An authenic sample of N-methyl 2-thenylamine prepared by the method of Blicke and Burckhalter (J. A. C. S. 64, 478 (1942)) yielded a phenylthiourea having a melting point of 127°–128° C.

*Example IV*

To about one mole of 2-chlorothiophene were added about 2 moles of paraformaldehyde, about one mole of ammonium chloride and about 0.33 mole of acetic acid. The resultant mixture was vigorously agitated and heated to about 70° C. The temperature was held in the range 70° to 75° C. for about two hours. Thereafter the pH of the reaction mixture was raised to about pH 4 by the addition of a 10 per cent aqueous solution of sodium hydroxide. The reaction mixture was steam distilled, 54 parts by weight of 2-chlorothiophene recovered, and the aqueous layer of the distillate returned to the reaction mixture. The reaction mixture was then extracted with diethyl ether, dried and the solvent removed from the extract. The solvent-free extract was then fractionated under reduced pressure to obtain the fractions having the characteristics given in Table II.

*Table II*

| Fraction No. | Pot Temp., °C. | Vapor Temp., °C. | Pressure, mm. Hg | Parts by Weight | $n_D^{20}$ |
|---|---|---|---|---|---|
| 1 | 87-115 | 65-75 | 1 | 4 | 1.5608 |
| 2 | 115-150 | 75-77 | 1 | 5 | 1.5548 |
| 3 | 150-170 | 120-131 | 1 | 8 | 1.5832 |
| 4 | 170-173 | 131-135 | 1 | 5 | 1.5950 |
| 5 | 173-180 | 135-137 | 1 | 12 | 1.5980 |
| 6 | 181-195 | 146-149 | 1 | 14 | 1.5933 |
| Residue | | | | 17 | |

Fraction number 5 was analyzed for chlorine and sulfur. The analysis indicated a chlorine concentration of 22.44 per cent and a sulfur concentration of 21.39 per cent. A one gram portion of fraction number 3 was oxidized with potassium permanganate in mildly basic solution. This oxidation yielded an acid with a melting point of 151° to 152.5° C. When this acid was mixed with an authentic sample of 5-chloro-2-thiophenecarboxylic acid no depression of the melting point was observed.

The reaction mixture was made basic (pH 9) by the addition of 10 per cent aqueous sodium hydroxide solution. The mixture was then extracted with diethyl ester, dried and the solvent removed. The residual liquid was then distilled in a vacuum at a pressure of 5 millimeters of mercury and at a still temperature of 80°–86° C. and a vapor temperature of 75°–78° C. The distillate represented 70 per cent of the residue of the ether extract and had a refractive index $n_D^{30}$ of 1.5272. When mixed with phenyl isothiocyanate a phenylthiourea did not form. A methiodide was prepared however which, after recrystallization from ethanol, melted at 193.5°–194.5° C. This is indicative of N,N-dimethyl 5-chloro-2-thenylamine.

For $C_8H_{13}ClNS$:

| | Calculated | Found |
|---|---|---|
| Nitrogen, per cent | 4.40 | 4.38 |

*EXAMPLE V*

Example IV was repeated with some changes. Thus, to one mole of 2-chlorothiophene were added 4 moles of formaldehyde, as trioxymethylene, 2 moles of ammonium chloride, about 1.8 moles of acetic acid and a little water, i. e., 10 volume per cent calculated from the volume of the acetic acid used. The resultant mixture was agitated and heated to about 70° C., and the reaction temperature held in the range about 70° to 75° C., for about two hours. No 2-chlorothiophene could be recovered. However, 43 parts by weight of di-(5-chloro-2-thenyl)amine hydrochloride, $(C_4H_2ClSCH_2)_2NH.HCl$, were removed from the reaction mixture by filtration. Thereafter the pH of the filtrate was raised to 4 and the mixture steam distilled. Twenty-five parts by weight of crude 5-chloro-2-thiophenealdehyde were extracted by means of ether from the steam distillate. Distillation of the crude product under reduced pressure yielded pure 5-chloro-2-thiophenealdehyde, having a boiling point at 0.7 millimeter of mercury of 63°–64° C., and a refractive index, $n_D^{20}$, of 1.5942. The semicarbazone was prepared and after four recrystallizations from alcohol and water had a melting point of 218°–219° C. (block method—uncorrected). Analysis of the semicarbazone, $C_6H_6ClN_3OS$ indicated a nitrogen content of 20.51 per cent as compared with the calculated nitrogen content of 20.59 per cent. The amines were isolated as described hereinbefore. The only amine isolated was the N,N-dimethyl-5-chloro-2-thenylamine having a boiling point at 0.3 millimeter of mercury of 42.5° C., and a refractive index, $n_D^{20}$, of 1.5335. The methiodide derivative after three recrystallizations from absolute ethanol melted at 193.5°–194.5° C. When analyzed, the following results were obtained:

For $C_8H_{13}ClINS$:

|  | Calculated | Found |
|---|---|---|
| Carbon, per cent | 30.18 | 30.15 |
| Hydrogen, per cent | 4.09 | 3.80 |
| Nitrogen, per cent | 4.40 | 4.38 |

EXAMPLE VI

To 140 parts by weight of tertiary butylthiophene (about 1 mole) were added 169 parts by weight of 35.5 per cent aqueous formaldehyde solution (about 2 moles), about 53.5 parts by weight of ammonium chloride (about 1 mole) and about 30 parts by weight of acetic acid (about 0.5 mole). The mixture was stirred rapidly and heated to 70° C. The temperature of the reaction mixture was maintained within the range 70°–75° C. for about two hours. Thereafter the mixture was cooled to room temperature (65°–75° F.) and the pH of the mixture raised to approximately pH 4 by the addition of 10 per cent aqueous sodium hydroxide solution. Then the neutralized reaction mixture was steam-distilled to remove any unreacted tertiary butylthiophene. The aqueous portion of the distillate was returned to the reaction mixture and the reaction mixture extracted with diethyl ether. The ether extract was washed with 5 per cent aqueous sodium carbonate solution and the solvent removed. The residue of the extraction was then distilled as indicated by the following log of the operation:

| Cut No. | Temp., °C. | Pressure, mm. Hg | Parts by Weight | $n_D^{20}$ |
|---|---|---|---|---|
| 1 | 84–91 | 3 | 8 | 1.5084 |
| 2 | 91–96 | 3 | 9 | 1.5148 |
| 3 | 87–110 | 1 | 2 | 1.5193 |
| 4 | 135–150 | 1 | 9 | 1.5302 |
| 5 | 150–155 | 1 | 4 | 1.5348 |
| 6 | 155–162 | 1 | 9 | 1.5356 |
| 7 | 162–166 | 1 | 10 | 1.5356 |
| 8 | 176 | 1 | 11 | 1.5358 |
| Residue | | | 18 | |

Semicarbazones were prepared by the reaction of the aldehydes of cuts Nos. 1 and 2 with semicarbazide hydrochloride and sodium acetate. Both semicarbazones after recrystallizations melted at 212°–214° C. The semicarbazone prepared from cut No. 2 was analyzed for nitrogen and sulfur with the results as tabulated:

For $C_{10}H_{15}N_3OS$:

|  | Calculated | Found |
|---|---|---|
| Nitrogen, per cent | 18.65 | 18.31 |
| Sulfur, per cent | 14.23 | 14.16 |

Cut No. 2 was analyzed for sulfur and found to contain 17.67 per cent sulfur. Cut No. 7 would not form a semicarbazone in the usual manner and was analyzed and found to contain 19.63 per cent of sulfur. This cannot be reconciled with any simple thiophene derivative of tertiary butylthiophene and was not further identified in a simple manner.

The reaction mixture was made basic with aqueous 10 per cent sodium hydroxide solution and extracted with diethyl ether. The ether solution was dried and the solvent removed. The residue did not form a phenylthiourea but did form a methiodide with methyl iodide. After four recrystallizations from absolute ethanol, the methiodide melted at 193°–194° C. with decomposition. The methiodide was dried in vacuo and analyzed for nitrogen.

For $C_{12}H_{22}INS$:

|  | Calculated | Found |
|---|---|---|
| Nitrogen, per cent | 4.13 | 4.51 |

This analysis corresponds, within reasonable limits, to a methiodide of N,N-dimethyl tertiary butyl-2-thenylamine ($C_{12}H_{22}INS$).

EXAMPLE VII

About 1 mole of 3-methylthiophene was reacted with about 1 mole of ammonium chloride and about 2 moles of formaldehyde at 45° C. The hydrolysis of the formaldimine was found to proceed well at 70°–80° C. but higher temperatures such as 100° C. may be used. The hydrolysis can be performed within the temperature range of about 60° to about 110° C.

From the foregoing reaction and hydrolysis at 70°–80° C. 3-methyl-2-thiophenealdehyde was obtained having a boiling point of 65°–66° C. at a pressure of 2.2 millimeters of mercury and a refractive index, $n_D^{20}$, of 1.5860. The semicarbazone has a melting point of 211° to 212° C. The aldehyde was identified by oxidation to the 3-methyl-2-thiophenecarboxylic acid.

Upon extraction of the reaction mixture with chloroform an amine hydrochloride having a melting point of 196°–199° C. with decomposition was obtained. The free amine formed a phenylthiourea having a melting point of 148°–149° C. The aqueous reaction mixture remaining after chloroform extraction was made basic and another amine having a boiling point of 71°–72° C. at a pressure of 4.5 millimeters of mercury and a refractive index, $n_D^{20}$, 1.5432 was obtained. This amine did not form a phenylthiourea.

EXAMPLE VIII

About 1 mole of 2-methylthiophene, about 1 mole of ammonium chloride and about 2 moles of formaldehyde as a 36 per cent aqueous solution were mixed and the reaction mixture thus formed warmed to about 70° C. for one hour. The mixture was then cooled to ambient temperatures and the pH raised to about pH 3 to pH 4. Thereafter the mixture was heated to 90° C. and held at that temperature for about one-half hour. The reaction mixture was cooled and extracted with benzene. Distillation of the extract yielded 5-methyl-2-thiophenealdehyde having a boiling point of 65°–75° C. at a pressure of 5.5 millimeters of mercury and an equivalent amount of a higher boiling product (boiling point 115°–121° C. at 3.0 mm. Hg) and a residue.

The 5-methyl-2-thiophenealdehyde yielded a semicarbazone which melted at 208°–209° C.

|  | Calculated | Found |
|---|---|---|
| Sulfur, per cent | 17.49 | 17.4 |
| Nitrogen, per cent | 22.95 | 23.51 |

The aqueous reaction mixture was neutralized with aqueous caustic soda and extracted with benzene. A material boiling at 130°–138° C. at a pressure of 2.5 millimeters of mercury and having a refractive index, $n_D^{20}$, of 1.5722 was isolated together with about an equivalent weight of a residue. The distillate was unhydrolyzed N-(5-methyl-2-thenyl)formaldimine.

EXAMPLE IX

About 10 moles of formaldehyde as an aqueous 36 per cent solution thereof were added to about 2 moles of 3-methylthiophene. About 4 moles of ammonium chloride were added and the well-stirred mixture was heated to about 35° C. Thereafter, the external source of heat was removed and the temperature maintained in the interval 40°–45° C. for about thirty minutes. The pH of the reaction mixture was then raised to about pH 3 by the addition of an aqueous 10 per cent sodium hydroxide solution. Steam distillation of the reaction mixture at atmospheric pressure yielded only 25 parts by weight of 3-methyl-2-thiophenealdehyde. Thus, it is apparent that hydrolysis at pH 3 produces a yield of only about 10 per cent. In distinct contrast, hydrolysis at or near the neutral point produces a yield of about 43 per cent as is shown in Example VIII.

EXAMPLE X

About 7.4 moles of formaldehyde, as a 36 per cent aqueous solution, and about 4 moles of ammonium chloride were added to about 3 moles of 3-methylthiophene. The reaction mixture was heated to about 35° C., whilst vigorously agitated, the source of external heat removed and the temperature of the reaction maintained within the range of about 40° to about 45° C., for about thirty minutes. Thereafter the pH of the reaction mixture was raised to a pH between pH 6 and pH 6.5. Steam distillation of the reaction mixture yielded about 176 parts by weight of 3-methyl-2-thiophenealdehyde equivalent to a yield of about 43 weight per cent. The product had a boiling point of 65° to 66° C., at a pressure of 2.2 millimeters of mercury and a refractive index, $n_D^{20}$, of 1.5860. The semicarbazone prepared therefrom melted at 211° to 212° C. Neutralization of the residue from the steam distillation with an aqueous 40 per cent sodium hydroxide solution yielded 12 parts by weight of N,N-dimethyl 3-methyl-2-thenylamine having a boiling point of 61° C., at a pressure of 2.5 millimeters and a refractive index, $n_D^{20}$, of 1.5386. The methiodide was prepared and after three recrystallizations melted at 179.5–180.5° C. with decomposition.

After drying in vacuo the product was analyzed as follows:

For $C_9H_{16}INS$:

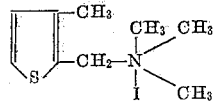

|  | Calculated | Found |
|---|---|---|
| Carbon, per cent | 36.36 | 35.86 |
| Hydrogen, per cent | 5.39 | 5.42 |
| Nitrogen, per cent | 4.71 | 4.76 |
| Sulfur, per cent | 10.77 | 10.8 |

The preparation of 5-chloro-2-thiophenealdehyde and the preparation of 5-methyl-2-thiophenealdehyde, 3-methyl-2-thiophenealdehyde and tertiary butyl-2-thiophenealdehyde establish respectively that halo-2-thiophenealdehydes and alkyl-2-thiophenealdehydes in which the halogen atom and the alkyl group are attached to the thiophene nucleus can be prepared by the method described hereinbefore. The preparation of the thiophenealdehydes which has been described hereinbefore establish that 2-thiophenealdehydes having one or more substituent groups such as alkyl, aryl, alkaryl, aralkyl naphthenyl (saturated or unsaturated) or one or more substituent elements such as chlorine, bromine, etc., or, in general, having one or more stable electropositive nuclear substituent groups can be prepared by the methods described hereinbefore and illustrated by the examples given herein. Wherever the word "aryl" appears in connection with substituent groups herein, it is intended to refer to the corresponding aromatic hydrocarbon.

I claim:

1. A method for preparing a 2-thiophenealdehyde which comprises hydrolyzing a N-(2-thenyl)formaldimine in acidic medium having a pH above 1.

2. A method for preparing a 2-thiophenealdehyde which comprises hydrolyzing a N-(2-thenyl)formaldimine at about pH 3 to about 6.9.

3. A method for preparing a 2-thiophenealdehyde which comprises heating one of the group consisting of N-(2-thenyl)formaldimine and N-(2-thenyl)formaldimine having not more than three substituent groups selected from the group consisting of alkyl, aryl, alkaryl, aralkyl, naphthenyl and halogens having a molecular weight greater than 38 at about pH 3 to about 6.9 at a temperature of about 60° to about 110° C.

4. A method for preparing a nuclear substituted 2-thiophenealdehyde which comprises hydrolyzing a nuclear substituted N-(2-thenyl)-formaldimine in acid medium having a pH above 1.

5. A method for preparing a nuclear substituted 2-thiophenealdehyde which comprises heating a nuclear substituted N-(2-thenyl)formaldimine in a medium having a pH of 3 to 6.9 at a temperature of about 60°–110° C.

6. A method for preparing 5-chloro-2-thiophenealdehyde which comprises hydrolyzing N-(5-chloro-2-thenyl)formaldimine in aqueous medium at a pH of about 3 to about 6.9.

7. A method for preparing a 5-halo-2-thiophenealdehyde which comprises hydrolyzing a N-(5-halo-2-thenyl)formaldimine in aqueous medium at a pH of about 3 to about 6.9.

8. A method for preparing a halo-2-thiophenealdehyde which comprises hydrolyzing N-(halo- 2-thenyl(formaldimine in aqueous medium at a pH of about 3 to about 6.9.

9. A method of preparing an alkyl-2-thiophenealdehyde which comprises hydrolyzing N-(alkyl-2-thenyl)formaldimine in aqueous medium at a pH of about 3 to about 6.9.

10. A method of preparing t-butyl-2-thiophenealdehyde which comprises hydrolyzing N-(t-butyl-2-thenyl)formaldimine in aqueous medium at a pH of about 3 to about 6.9.

11. N,N-dimethyl-5-chloro-2-thenylamine boiling at about 75°–78° C. at 5 millimeters pressure and having a refractive index $n_D^{30}$, of 1.5272 and forming a methiodide melting at 190°–192° C.

12. Method of preparing

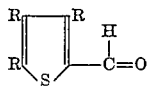

where R is hydrogen or one of the group consisting of alkyl, aryl, alkaryl, aralkyl, naphthenyl and halogens having a molecular weight greater than 38 which comprises hydrolyzing a N-(2-thenyl)-formaldimine corresponding to the formula

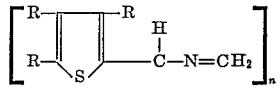

where R is the same as before and $n$ is a smaller integer, at a pH of about 3 to about 6.9.

13. A method of preparing

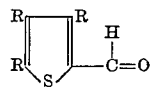

where R is hydrogen or one of the group consisting of alkyl, aryl, alkaryl, aralkyl, naphthenyl and halogens having a molecular weight greater than 38 which comprises hydrolyzing N-(2-thenyl)-formaldimine corresponding to the formula

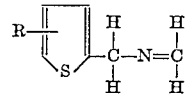

where R is the same as before in aqueous medium at a pH of about 3 to about 6.9.

14. A process for preparing 2-thiophenealdehydes and N-methyl 2-thenylamines and N,N-dimethyl 2-thenylamines which comprises mixing a thiophene with formaldehyde and NH₄Cl at about 60°–75° C. for about fifteen to sixty minutes, raising the pH to about 3 to about 6.9 and hydrolyzing the reaction mixture to produce the thiophenealdehyde, the N-methyl 2-thenylamine and the N,N-dimethyl 2-thenylamine.

HOWARD D. HARTOUGH.

No references cited.

Certificate of Correction

Patent No. 2,543,318 February 27, 1951

HOWARD D. HARTOUGH

It is hereby certified that error appears in the printed specification of the above numbered patent requiring correction as follows:

Column 3, line 43, for "about 0°" read *about 80°*; column 8, line 53, for "1 5860" read *1.5860*;

and that the said Letters Patent should be read as corrected above, so that the same may conform to the record of the case in the Patent Office.

Signed and sealed this 21st day of August, A. D. 1951.

[SEAL]

THOMAS F. MURPHY,
*Assistant Commissioner of Patents.*